H. DELANO.
Carriage Hubs and Axles.
No. 448.
Patented Oct. 28, 1837.
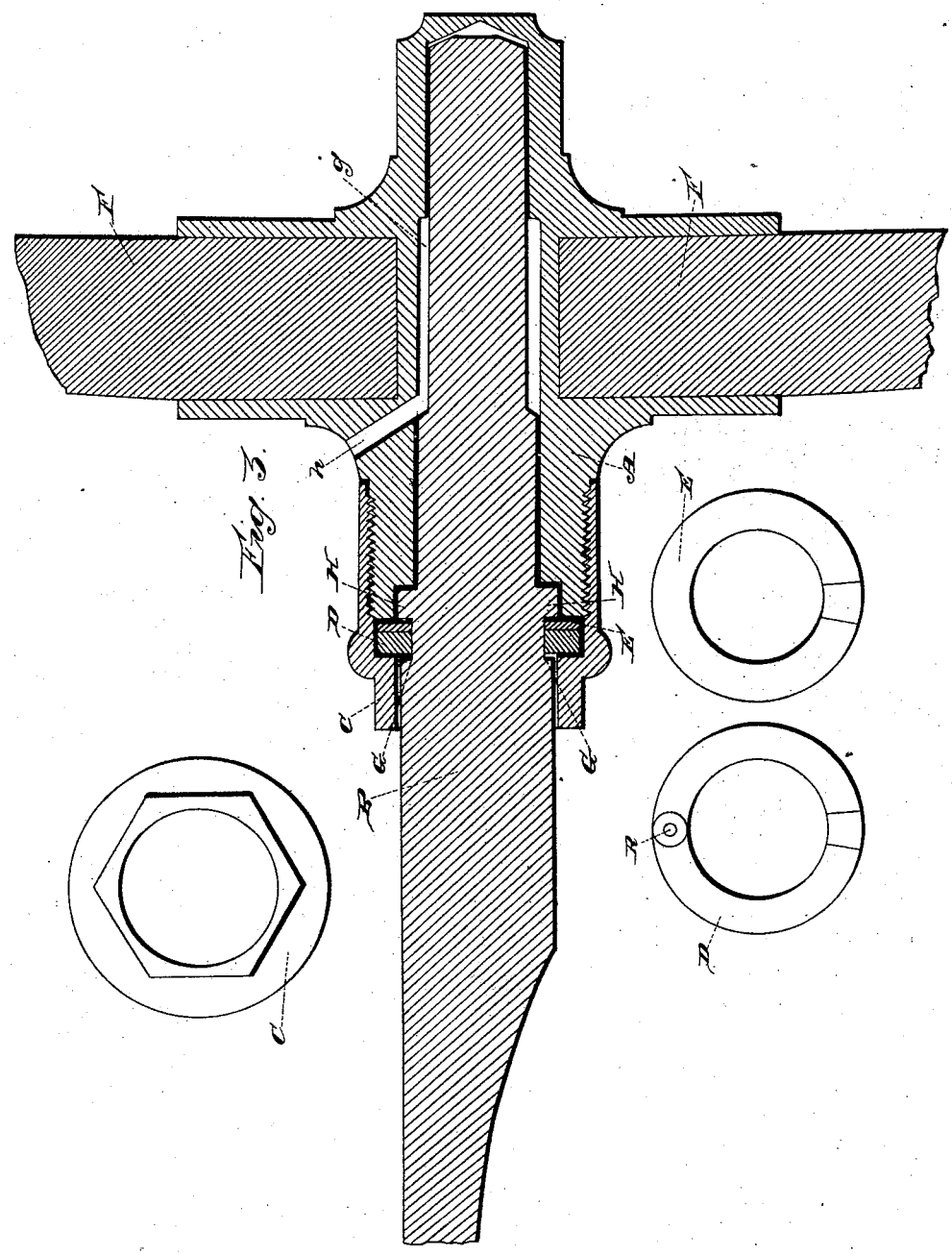

UNITED STATES PATENT OFFICE.

HOWARD DELANO, OF SKENEATELES, NEW YORK.

MODE OF CONSTRUCTING HUBS FOR THE WHEELS OF CARRIAGES, &c.

Specification forming part of Letters Patent No. 448, dated October 28, 1837; Reissued September 25, 1839, No. 14.

*To all whom it may concern:*

Be it known that I, HOWARD DELANO, of Skaneateles, in the county of Onondaga and State of New York, have invented, constructed, and applied to use new and useful Improvements in the Manufacture of Wheel-Carriages—first, in the mode or means by which cast-iron hubs and the wheels of carriages are attached to and held on the arms of the axletree, and, secondly, in providing a chamber between the hub and the arm of the axletree for the reception and holding of the oil and keeping it free from the intrusion of dust and dirt of any kind—which said improvements are described and may be constructed in the following manner, that is to say:

The first—the mode or means by which castiron hubs and the wheels of carriages are attached to and held on the arms of the axletree—is effected thus, (see annexed drawings making part of this specification.) On the arm, B, of the axletree, at the same distance from the end of the arm as the length of the bore in the hub, a groove G sufficiently wide for the insertion of a metal washer D and a leather washer E is turned, leaving between the washers and a shoulder inside of the hub a projecting band or shoulder H on the arm of the axletree fitting the bore in the hub from the inner end of the hub to the shoulder inside of the hub. Over these washers a metal screw cap or band C with a hole in the center of the cap to admit the passing of the arm of the axletree through the cap or band, screws on to the inner end of the hub, and by embracing within it the washers inserted in their groove, retains and holds securely the hub and wheel on the axletree—the inner end of the hub having a screw cut on it to fit the screw turned in the inside of the cap or band—the metal washer D is made in two pieces, each piece forming nearly a semicircle of uniform thickness except at the lapping end which is of half the thickness of the other part, so as to make the two ends when lapped together of the same thickness as the other parts, a rivet R being inserted through the two ends when lapped forms a rule joint by which the washer can, when the cap or band is unscrewed and moved off from the hub, be opened taken off from the arm of the axletree and another substituted in its place when required without taking the hub off from the axletree.

The chamber g for holding oil is obtained by boring from the shoulder inside the inner end of the hub through the center of the hub to a point an half inch beyond the outer edge of the spoke mortise, a bore of a diameter an eighth or a quarter of an inch larger than the remainder of the bore which is to be continued to within a quarter or an eighth of an inch of the outer end of the hub, that end being left closed—the arm of the axletree being turned of a diameter to fit the bore in the hub from the inner end of the hub to a point an half inch short of where the line of the inner edge of the spoke mortise if continued to the axletree would meet the axletree, at which point it is suddenly diminished to a diameter fitting the smaller bore within the hub. This leaves the space between the inside of the hub and the circumference of the axletree and the points where the smaller diameter of the axletree and the smaller bore in the hub commence, sufficient to contain the necessary quantity of oil—and the outer end of the hub being closed and the screw cap or band embracing the washers within it closes the mouth of the bore in the hub, preventing the escape of the oil out of it, as well as the intrusion of any dust or dirt into it. A small hole h being drilled from the outerside of the hub slanting into this chamber admits a supply of oil whenever required, and is closed effectually by a screw stopper at all other times.

Now therefore I, the said HOWARD DELANO, do specify and claim as my invention—

First, the mode or means by which cast-iron hubs and the wheels of carriages on the arms of the axletree are attached and held securely by the insertion of jointed washers in a groove on the arm of the axletree and the screw cap or band embracing within it the washers and screwing on the inner end of the hub in the manner before described.

In witness whereof I have hereunto subscribed my name the 29th day of August, in the year of our Lord one thousand eight hundred and thirty seven.

HOWARD DELANO.

Witnesses:
WILLIAM L. GREENE;
JNO. S. FURMAN.

[FIRST PRINTED 1914.]